United States Patent [19]

Meynier

[11] Patent Number: 4,984,661
[45] Date of Patent: Jan. 15, 1991

[54] MULTIPLE DISC BRAKE

[75] Inventor: Guy Meynier, Aulnay Sous Bois, France

[73] Assignee: Bendix France, Drancy, France

[21] Appl. No.: 342,913

[22] Filed: Apr. 24, 1989

[30] Foreign Application Priority Data

Apr. 28, 1988 [FR] France .................. 88 05653

[51] Int. Cl.$^5$ ............................................. F16D 55/36
[52] U.S. Cl. .................. 188/71.5; 188/18 A; 192/70.19
[58] Field of Search ............ 188/18 A, 71.1, 71.5, 188/73.46; 192/70.19, 70.2

[56] References Cited

U.S. PATENT DOCUMENTS

| 1,998,613 | 4/1935 | Ford ..................................... 192/70.2 |
| 4,576,255 | 3/1986 | Méry et al. ......................... 188/71.5 |
| 4,598,799 | 7/1986 | Thioux ................................ 188/71.5 |
| 4,614,254 | 9/1986 | Mery et al. ...................... 188/71.1 X |
| 4,848,526 | 7/1989 | Fargier et al. .................. 188/71.1 X |

FOREIGN PATENT DOCUMENTS

| 0130883 | 1/1985 | European Pat. Off. |
| 57-12135 | 1/1982 | Japan . |
| 112833 | 5/1986 | Japan ................................ 188/71.5 |
| 2162260 | 1/1986 | United Kingdom ............... 188/71.1 |

Primary Examiner—George E. A. Halvosa
Attorney, Agent, or Firm—Larry J. Palguta; Ken C. Decker

[57] ABSTRACT

The invention relates to a brake with at least one stationary disc (10) and one axially movable disc (33). The movable disc (33) is mounted on hangers (17), themselves each fixed to a cylindrical column (16) parallel to the axis of the wheel. This column can move axially on bearings (15) carried by an extension (8) of the hub. This extension is in the form of a fork, with two teeth set apart axially and located on either side of the plate (2) forming the body of the hub. Seals (22) make it possible to maintain a reserve of grease in the region of the bearings (15).

3 Claims, 4 Drawing Sheets

MULTIPLE DISC BRAKE

The present invention relates to a disc brake of the type comprising at least two discs.

A single disc brake comprises a disc fixed to a shaft for example a wheel shaft, and two movable linings capable of gripping the disc between them. In a multiple-disc brake, a single disc is fixed to the shaft, and the second disc, like the possible following ones, is fixed to the shaft only in terms of rotation and must be capable of moving axially relative to the latter during braking, this resulting in a more complicated construction because the connection between the second disc and the shaft must both allow the relative movement of the parts in the axial direction and transmit considerable torques.

There has been a proposal U.S. Pat. No. 4,576,255 to mount the second disc on an internally splined sleeve which can slide on an externally splined part of the hub. It has emerged that the splined surfaces, which are costly to produce, can tend to seize or become worn.

To improve the strength of the parts, it is expedient if the contact surfaces serving both for axial sliding and for the transmission of the braking torques are as far as possible from the axis, but this then presents problems of bulk, cost and protection against the environment.

It is therefore an object of the invention to provide a brake, in which the sliding connection between the shaft and the second disc is obtained in a simple and inexpensive way, while at the same time giving good guarantees of durability.

To achieve this result, according to the present invention there is provided a brake comprising a wheel hub, a stationary disc fixed to a wheel hub, a movable disc coaxial relative to the first and integral with the hub in terms of rotation, but capable of moving axially in relation to the stationary disc, a first brake lining located between the two discs, a second brake lining located on the side of the first disc opposite the second disc, a third brake lining located on the side of the second disc opposite the first disc, and a caliper supporting the three brake linings and equipped with means making it possible to clamp the linings on the discs, the particular features of this brake being that:

the hub carries at least three pairs of bearings, these pairs being arranged uniformly relative to the wheel axis, and the bearings of each pair having a common axis parellel to the wheel axis, a shaft or column is mounted slideably on the two bearings of a pair, a hanger is mounted fixedly in terms of translational movement on each of the shafts approximately halfway between the ends of this shaft or column, the hangers are connected rigidly to the movable disc.

The arrangement of the invention makes it possible to shift the parts subject to wear, namely the bearing and shafts/columns, away from the axis of the hub and therefore reduce the forces which they support as equal pairs. These parts are simple parts which are easy to obtain and the properties of which are easier to guarantee constant than those of more complex parts.

According to an advantageous embodiment, each shaft or column is enclosed in a sealed chamber, on the one hand by means of flexible collars connecting each bearing to the corresponding face of the hanger and, on the other hand, by means for the external sealing of the bearings, and the shaft or column is pierced axially so as to allow the grease contained in the sealed chamber to pass from one end of the sealed chamber to the other.

Thus, the contact and sliding surfaces are both lubricated by the reserve of grease provided initially and protected against any attack originating from the outside atmosphere.

The invention will now be described by way of example with reference to the accompanying drawings in which.

Figure 1:
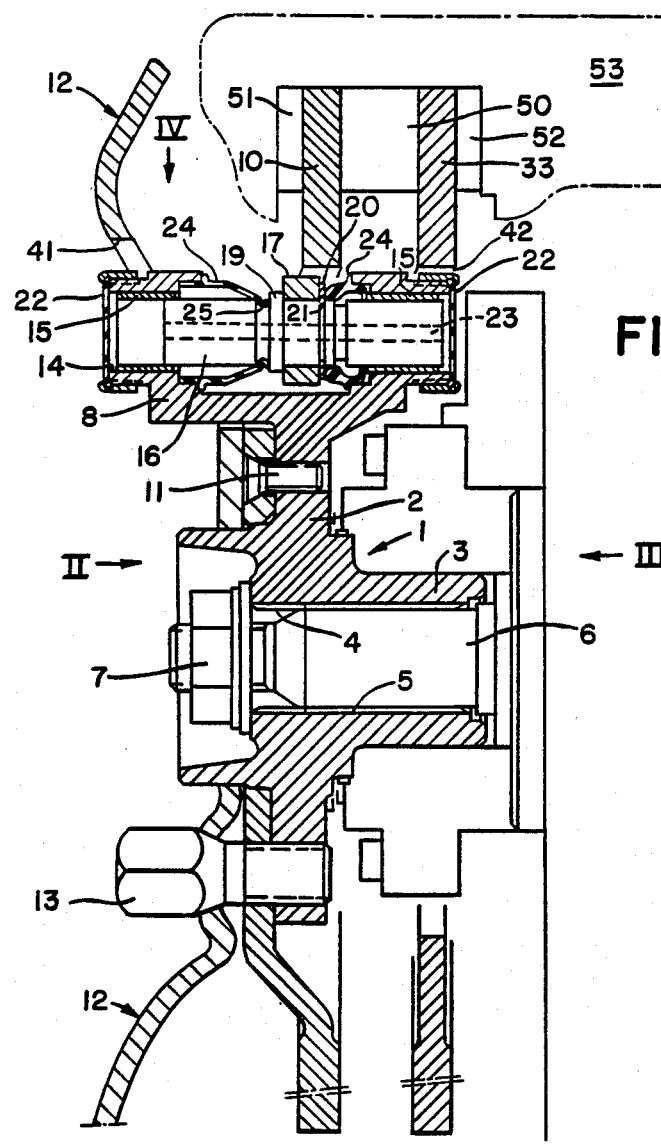
FIG. 1 is an axial section through the brake according the invention.
Figure 2:
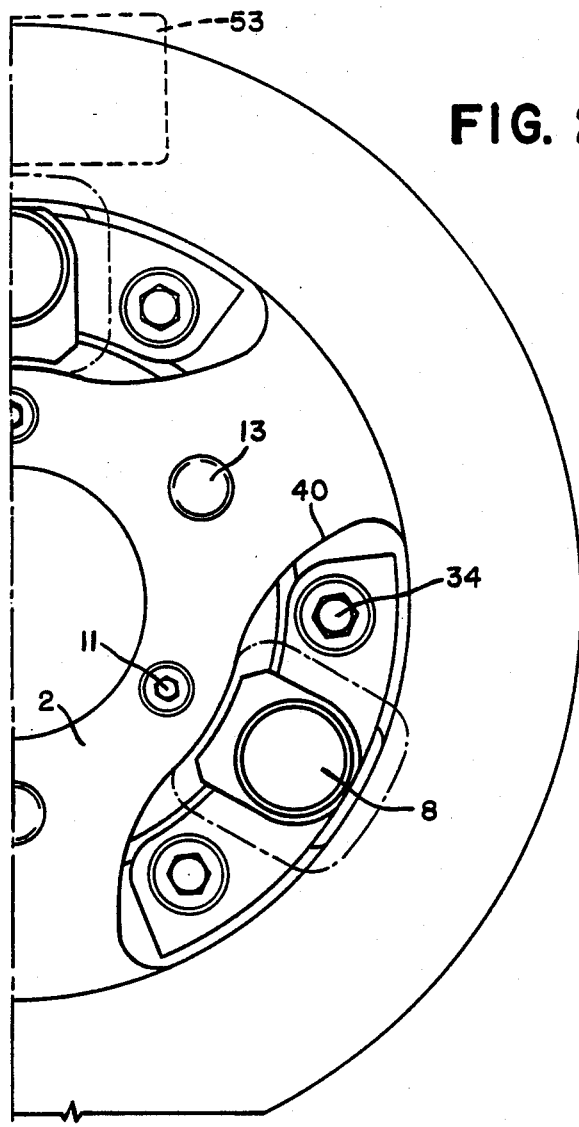
FIG. 2 is a half view according to the arrow II of FIG. 1, the wheel body being assumed removed.
Figure 3:
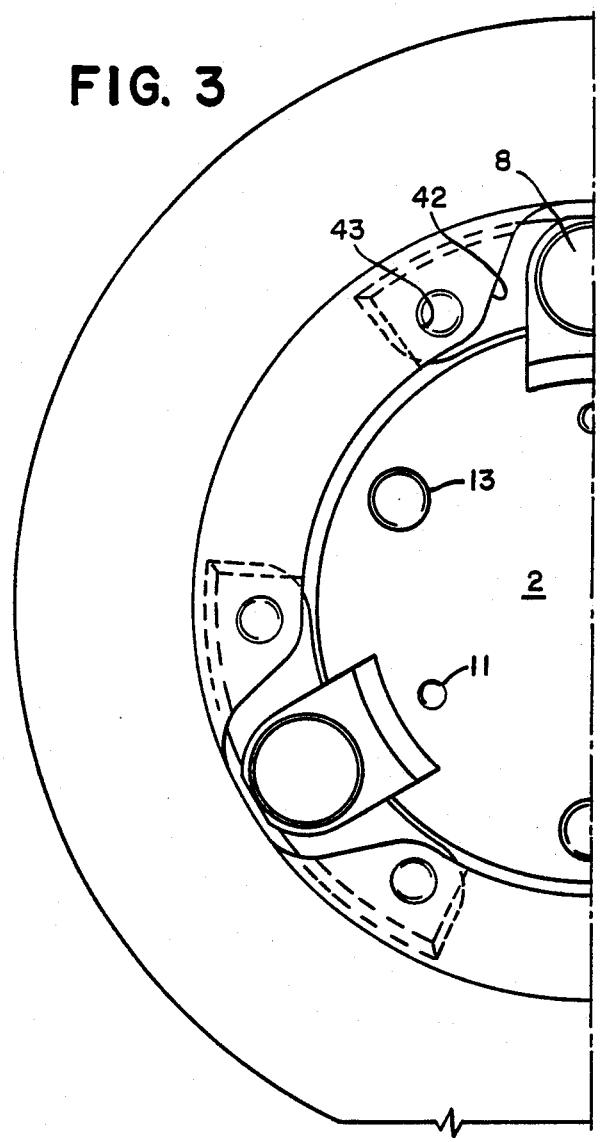
FIG. 3 is a half-view according to the arrow III of FIG. 1.

The device described in the drawings is intended for equipping a vehicle wheel. The central part of the device is a hub 1 of special shape, which has the two-fold function of connecting the wheel to its axle and of carrying the two brake discs.

The hub 1 comprises a plate 2 of substantially circular general shape, having at its center a thicker part 3, through which extends a hole 4 equipped with splines 5, for connecting it to the wheel shaft 6 which is immobilized by means of a nut 7. The plate 2, towards its periphery, carries three extensions 8 which project both radially and axially. The extensions 8 are in the form of a fork extending in an axial plane, that is to say the ends of these forks are on either side of the plane of the plate 2.

The drawings show forked extensions 8 in one piece with the plate 2.

However, it is possible for one tooth of the fork or both to be a separate piece retained, for example by screwing, on the rest of the hub. The advantage of this solution, which is a little more complicated, is that it makes assembly, especially the installation of the columns described below, appreciably easier.

The outer face of the plate 2, that is to say that facing towards the outside of the vehicle, on the left in FIG. 1, carries the stationary brake disc 10 by means of screws 11 arranged substantially in the radial plane of symmetry of the forked extensions 8.

The wheel 12 is fastened to the same plate 2 by means of fastening screws 13 which pass through the disc 10 and which are located at an equal distance from two screws 11. The fastening screws 13 of a diameter clearly larger than that of the screws 11 also serve for transmitting a large proportion of the brake forces directly from the disc 10 to the wheel 12. The ends of the forked extensions 8 have passing through them bores 14, the common axis of which is parallel to the axis f the wheel and in which bearings 15 are mounted.

Cylindrical pieces 16 or "columns" are mounted slideably in the bearings 15. The total length of a column is a little greater than the distance between the middle zones of the bearings 15 A hanger 17 is mounted in the central part of the column 16 without any possible axial movement in relation to the latter, because it is immobilized between a shoulder 19 of the column and a stop ring 20 retained in a groove 21 of the same column. The outer dimensions of the hanger 17 are such that it can move between the two teeth of the forked part 8, thereby driving the column 16. Screwed seals 22 are provided at the two ends of the inner bore 14. A bore 23 passes axially through the column 16. It can be seen that, if the inner volume of the bores 14 left free by the column 16 is filled with grease, the latter will pass from one side of the column to the other via this passage when the latter moves axially in one direction or the other.

To complete the protection of the bearings 15 and of the corresponding surfaces of the column, flexible collars 24 bear in a groove 25 of the column and on the corresponding edge of the forked part 8, preventing any attack by external atmospheric agents.

Figures 4, 5:
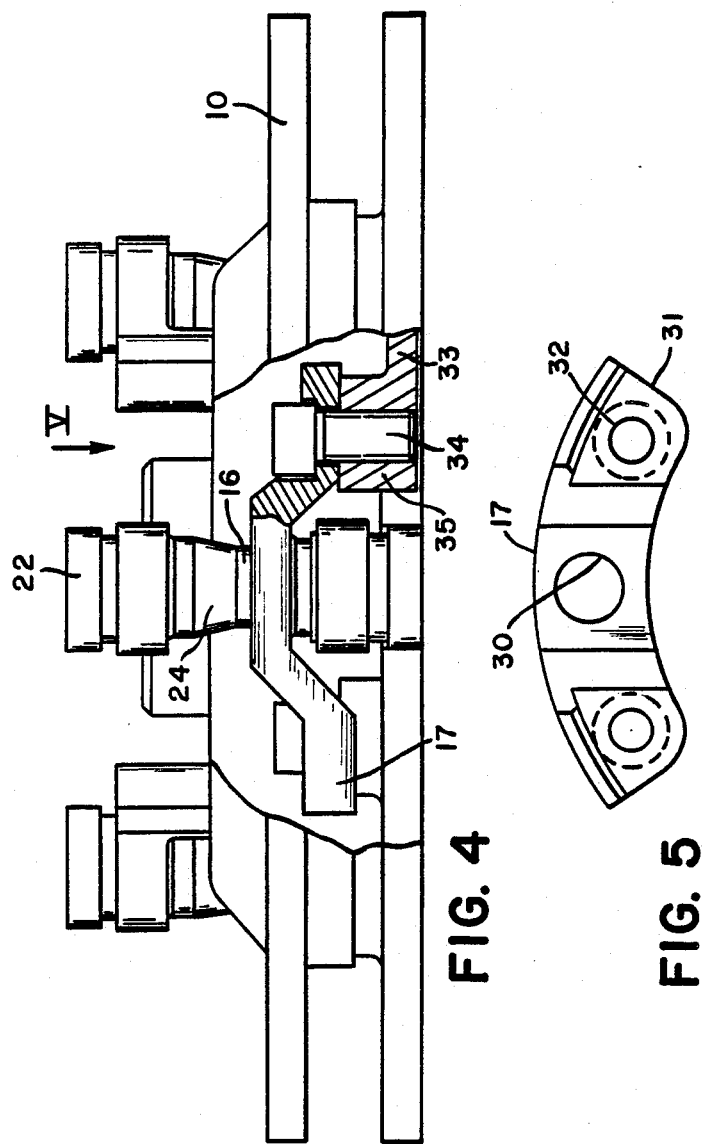
FIG. 4 is a view according to the arrow IV of FIG. 1, cut away and in partial section.
FIG. 5 is a view of a hanger alone parallel to the arrow V.

The form of the hanger 17 can be seen more clearly in FIGS. 4 and 5. It is a part having the general form of a V in a circumferential plane, with a central part, through which passes a bore 30, by means of which the hanger is mounted on the column 16, and two wings 31 provided with fastening holes 32, by means of which it is mounted on the movable disc 33 via screws 34 which are screwed into a thickened part 35 of the disc 33.

FIG. 5 also shows that, as seen in an axial view, the hanger 17 has the form of an arc of a circle concentric relative to the hub 1.

As shown in FIGS. 1 and 4, the stationary disc 10, as seen in axial section, has a curved form which is such that the plane of its active part, at the top in FIG. 1, is adjacent to the mid-plane of the plate 2 of the hub. The hanger 17 is also approximately in the mid-plane of the hub 2. To accommodate these various parts, the stationary disc 10 has an aperture 40 of a size sufficient to allow the passage not only of the hanger 17, but also of the end of the forked part 8, to allow this stationary disc to be mounted. It will be seen that the wheel 12 itself has an aperture 41, smaller than the aperture 40, which allows the passage of the forked part 8. As regards the movable disc 33, this has indentations 42 for the passage of the inner end of the forked part 8. The fastening holes 43 for the screws 34 are located on either side of the indentation 42. These structural arrangements make it possible, on the one hand, to shift the brake discs away from the wheel itself and, on the other hand, give the columns 16 a length sufficient for good sliding.

The three brake linings 50, 51, 52 and the caliper 53 carrying them have been represented by dashes (FIG. 1).

We claim:

1. A brake comprising a wheel hub, a stationary first disc fixed to the wheel hub, a movable second disc coaxial relative to the first disc and integral with the hub in terms of rotation but capable of moving axially in relation to the stationary first disc, a first brake lining located between the two discs, a second brake lining located on a side of the first disc opposite the second disc, a third brake lining located on a side of the second disc opposite the first disc, and a caliper equipped with means for clamping the linings on the discs, wherein said hub carries at least three pairs of bearings which are arranged uniformly relative to the wheel axis, the hub comprising a central plate carrying the pairs of bearings by means of an extension in the form of a fork, the bearings of each pair of bearings having a common axis parallel to said wheel axis, a shaft being mounted slideably on the two bearings of each pair of bearings, a hanger mounted fixedly in terms of translational movement on each of said shafts and located approximately half-way between opposite ends of the respective shaft, each shaft enclosed in a sealed chamber by means of flexible collar means connecting each bearing with a corresponding hanger and by means for externally sealing the bearings, and each hanger connected rigidly to the movable second disc.

2. The brake according to claim 1, wherein said extension in the form of a fork is integral with the hub.

3. The brake according to claim 1, wherein each of said shafts has an axial bore which permits grease contained within the associated sealed chamber to pass from one end of said sealed chamber to the other end.

* * * * *